US012461152B2

(12) United States Patent
Kuhn et al.

(10) Patent No.: US 12,461,152 B2
(45) Date of Patent: Nov. 4, 2025

(54) ARC FAULT CIRCUIT INTERRUPT TESTER AND METHOD

(71) Applicant: Klein Tools, Inc., Lincolnshire, IL (US)

(72) Inventors: Bruce R. Kuhn, Naperville, IL (US); Christian A. Castro, Deerfield, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 0 days.

(21) Appl. No.: 17/426,533

(22) PCT Filed: Jan. 29, 2019

(86) PCT No.: PCT/US2019/015590
§ 371 (c)(1),
(2) Date: Jul. 28, 2021

(87) PCT Pub. No.: WO2020/159478
PCT Pub. Date: Aug. 6, 2020

(65) Prior Publication Data
US 2022/0091187 A1    Mar. 24, 2022

(51) Int. Cl.
*G01R 31/327* (2006.01)
(52) U.S. Cl.
CPC ................. *G01R 31/3274* (2013.01)
(58) Field of Classification Search
None
See application file for complete search history.

(56) References Cited

U.S. PATENT DOCUMENTS

| 6,128,169 | A | * | 10/2000 | Neiger | H02H 3/334 324/520 |
| 9,671,466 | B2 | | 6/2017 | Murahari et al. | |
| 2002/0039026 | A1 | | 4/2002 | Stroth et al. | |
| 2004/0100274 | A1 | * | 5/2004 | Gloster | G01R 31/3277 324/536 |
| 2007/0008103 | A1 | * | 1/2007 | Nicolls | G01R 31/3277 340/515 |

(Continued)

FOREIGN PATENT DOCUMENTS

EP    1731915 A1    12/2006

OTHER PUBLICATIONS

European Patent Office, International Search Report in International Patent Application No. PCT/US2019/015590, 5 pp. (Nov. 11, 2019).
(Continued)

*Primary Examiner* — Nasima Monsur

(57) ABSTRACT

An arc fault circuit interrupt (AFCI) tester device includes a housing and a circuit assembly disposed within the housing. The circuit assembly includes a first load switching circuit for creating a pulse pattern having a plurality of pulses. The circuit assembly includes a second load switching circuit for creating an overlay signal superimposed upon at least one pulse of the plurality of pulses. The AFCI tester device includes an interface receiving the plurality of pulses and the overlay signal. The interface extends outside of the housing and is adapted for electrically coupling the circuit assembly to the AFCI device under test (DUT). The interface is adapted to transmit the pulse pattern and the overlay signal to the AFCI DUT.

8 Claims, 11 Drawing Sheets

(56) References Cited

U.S. PATENT DOCUMENTS

| | | | |
|---|---|---|---|
| 2008/0284450 A1* | 11/2008 | Lee | H03K 12/00 |
| | | | 324/555 |
| 2009/0189615 A1 | 7/2009 | Kinsel | |
| 2009/0219038 A1* | 9/2009 | Stockinger | G01R 31/001 |
| | | | 324/678 |
| 2010/0103568 A1 | 4/2010 | Lee | |
| 2012/0292991 A1* | 11/2012 | Dodal | H02H 3/16 |
| | | | 307/11 |
| 2012/0319709 A1* | 12/2012 | Brazis, Jr. | G01R 31/3272 |
| | | | 324/750.01 |
| 2014/0168843 A1* | 6/2014 | Privitera | G01R 31/50 |
| | | | 702/58 |

OTHER PUBLICATIONS

European Patent Office, Written Opinion in International Patent Application No. PCT/US2019/015590, 6 pp. (Nov. 11, 2019).

\* cited by examiner

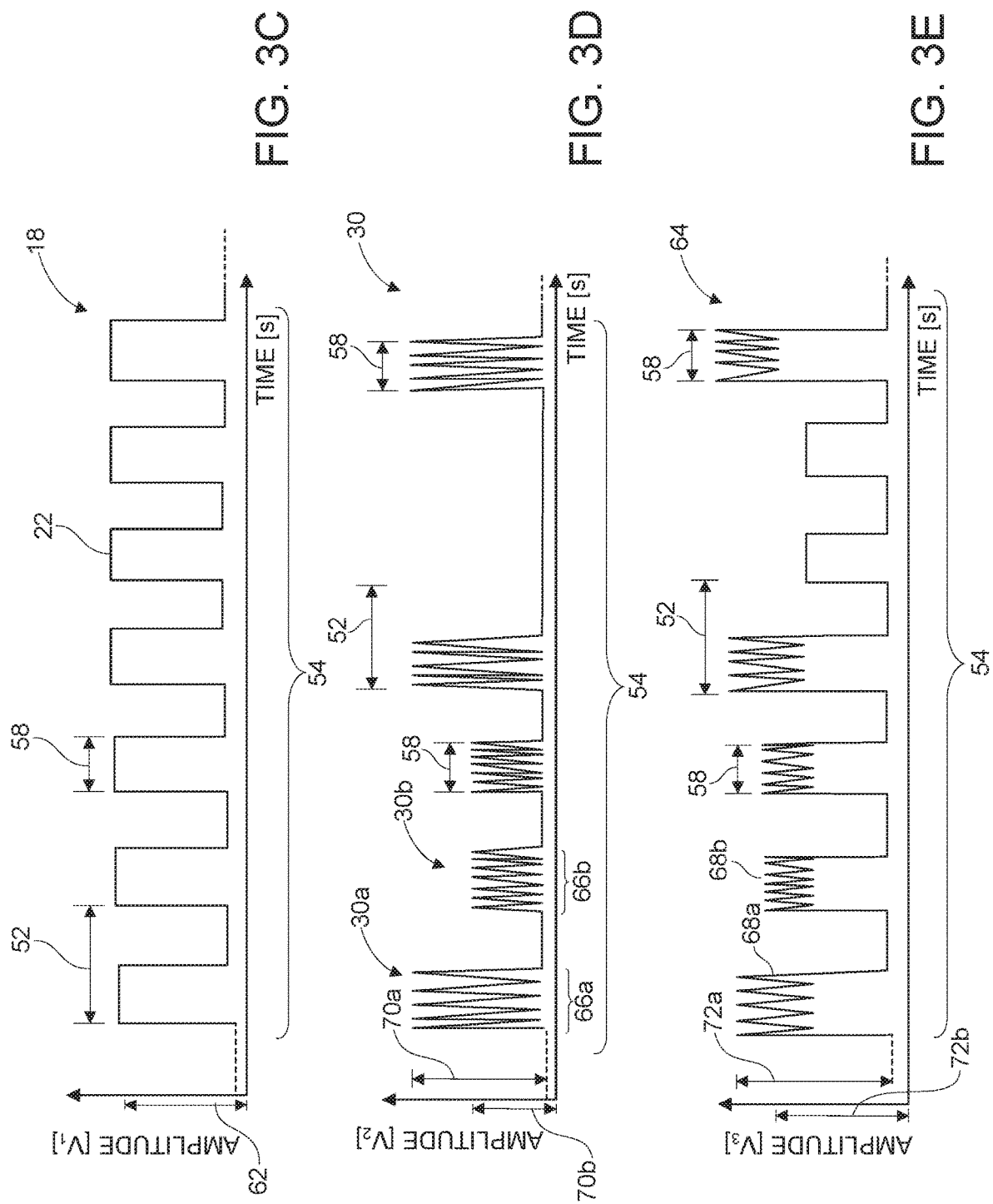

ARC FAULT CIRCUIT INTERRUPT TESTER AND METHOD

TECHNICAL FIELD

The present disclosure relates to electrical test equipment and methods for electric circuits and, more particularly, to systems and methods for testing functionality of arc fault circuit interrupt devices.

BACKGROUND

Arc fault circuit interrupt (AFCI) devices are required by the National Electrical Code (NEC) and other related building codes and standards in the United States and internationally. AFCI devices are designed to break a circuit that it protects upon occurrence of a potentially dangerous electric arc event, thereby mitigating risk of fire and other undesired consequences of the arc event. AFCI devices are tested during their manufacture and they may be periodically tested after being installed in homes, business, and other facilities.

Testing and certification of AFCI devices is governed by practical standards, including as provided by Underwriters Laboratories (UL) 1699. In practice, the guidelines of UL 1699 must be tailored to a wide variety of AFCI makes and models available on the market and/or currently installed in electrical facilities. In at least some practical settings, developing test protocols for specific AFCI makes and/or models requires extensive experimentation and/or use of multiple test devices.

For at least some known AFCI test devices and methods, false positive or false negative AFCI trips can occur, and be a nuisance for home owners. This requires the manufacturers of these devices to develop their own custom algorithms to determine if the arcing pattern is an actual arc, or just a household device being turned on or off. If a test device is designed to simulate an arcing based on patterns specified in UL 1699, some ACFI devices on the market may not trip, and UL 1699 does not require these devices to always trip. Since many existing AFCI devices cannot be tested by generating a UL 1699 simulated arc, there exists a need for a new generation of AFCI testers.

SUMMARY OF THE DISCLOSURE

In one aspect, the disclosure describes an arc fault circuit interrupt (AFCI) tester device. The AFCI tester device includes a housing and a circuit assembly disposed within the housing. The circuit assembly includes a first switching circuit for placing a load across the Hot and Neutral wire in a unique pulse pattern having a plurality of pulses. The circuit assembly includes a second switching circuit for switching in a second load superimposed upon at least one pulse of the plurality of pulses. The AFCI tester device includes an interface receiving the variable load circuitry. The interface extends outside of the housing and is adapted for electrically coupling the circuit assembly to an AFCI device under test (DUT). The interface is adapted to allow the variable load to be connected across Hot and Neutral wires connecting to the AFCI DUT.

In another aspect, the disclosure describes a circuit assembly for testing an AFCI device. The circuit assembly includes a first switching circuit for inducing a pulse pattern having a plurality of pulses. The circuit assembly includes a second switching circuit for inducing an overlay signal superimposed upon at least one pulse of the plurality of pulses. The circuit assembly includes logic circuitry coupled to the first and second switching circuits. The logic circuitry is configured to transmit a first control signal to the first switching circuit to facilitate inducing the pulse pattern. The logic circuitry is configured to transmit a second control signal to the second switching circuit to facilitate inducing the overlay signal.

In yet another aspect, the disclosure describes a method for testing an AFCI device. The method includes inducing, by a first switching circuit, a pulse pattern having a plurality of pulses. The method includes inducing, by a second switching circuit, an overlay signal superimposed upon at least one pulse of the plurality of pulses. The method includes transmitting the pulse pattern and the overlay signal to an AFCI DUT.

In still another aspect, the disclosure describes a circuit test device. The circuit test device includes a housing and a circuit disposed in the housing. The circuit includes an electromagnetic field (EMF) sensor and a signal detector coupled to the EMF sensor. The circuit test device includes an interface connected to the circuit and extending through the housing. The interface is adapted for coupling the circuit to a circuit under test (CUT). The EMF sensor is configured to generate a signal in the presence of a time varying flow of current from the CUT in the circuit, and provide the signal to the signal detector.

In another aspect, the disclosure describes a circuit for testing a circuit under test (CUT). The circuit includes an electromagnetic field (EMF) sensor and a signal detector coupled to the EMF sensor. The circuit includes an interface adapted for coupling the circuit to a circuit under test (CUT). The EMF sensor is configured to generate a signal in the presence of a time varying flow of current from the CUT in the circuit, and provide the signal to the signal detector.

In yet another aspect, the disclosure describes a method for testing a circuit. The method includes interfacing a conductor with a circuit under test (CUT). The conductor is positioned proximal an electromagnetic field (EMF) sensor. The method includes inducing a signal in the EMF sensor in response to a time varying flow of current from the CUT to the conductor. The method includes transmitting the induced signal from the EMF sensor to a signal detector. The method includes determining, by the signal detector and based on the induced signal, a presence of the time varying flow of current from the CUT to the conductor.

In still another aspect, the disclosure describes a method for testing a circuit. The method includes interfacing, by an interface, a circuit under test (CUT) with an electromagnetic field (EMF) sensor. The EMF sensor is positioned proximal the interface. The method includes inducing a signal in the EMF sensor in response to a time varying flow of current from the CUT to the interface. The method includes transmitting the induced signal from the EMF sensor to a signal detector. The method includes determining, by the signal detector and based on the induced signal, a presence of the time varying flow of current from the CUT to the interface.

Further and alternative aspects and features of the disclosed principles will be appreciated from the following detailed description and the accompanying drawings. As will be appreciated, the principles related to devices, systems, and methods for testing AFCIs disclosed herein are capable of being carried out in other and different embodiments, and capable of being modified in various respects. Accordingly, it is to be understood that both the foregoing general description and the following detailed description

BRIEF DESCRIPTION OF THE DRAWINGS

FIG. 3C is a plot of a pulse pattern induced by the first switching circuit of the AFCI tester device of FIG. 1 according to an embodiment of the disclosure.

FIG. 3D is a plot of an overlay signal induced by a second switching circuit of the AFCI tester device of FIG. 1 according to an embodiment of the disclosure.

FIG. 3E is a plot of a superimposed load pattern delivered as a superimposed signal to an AFCI device under test (DUT) by the AFCI tester device of FIG. 1 according to an embodiment of the disclosure.

DETAILED DESCRIPTION

Reference will now be made in detail to specific embodiments or features, examples of which are illustrated in the accompanying drawings, which are not drawn to scale. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
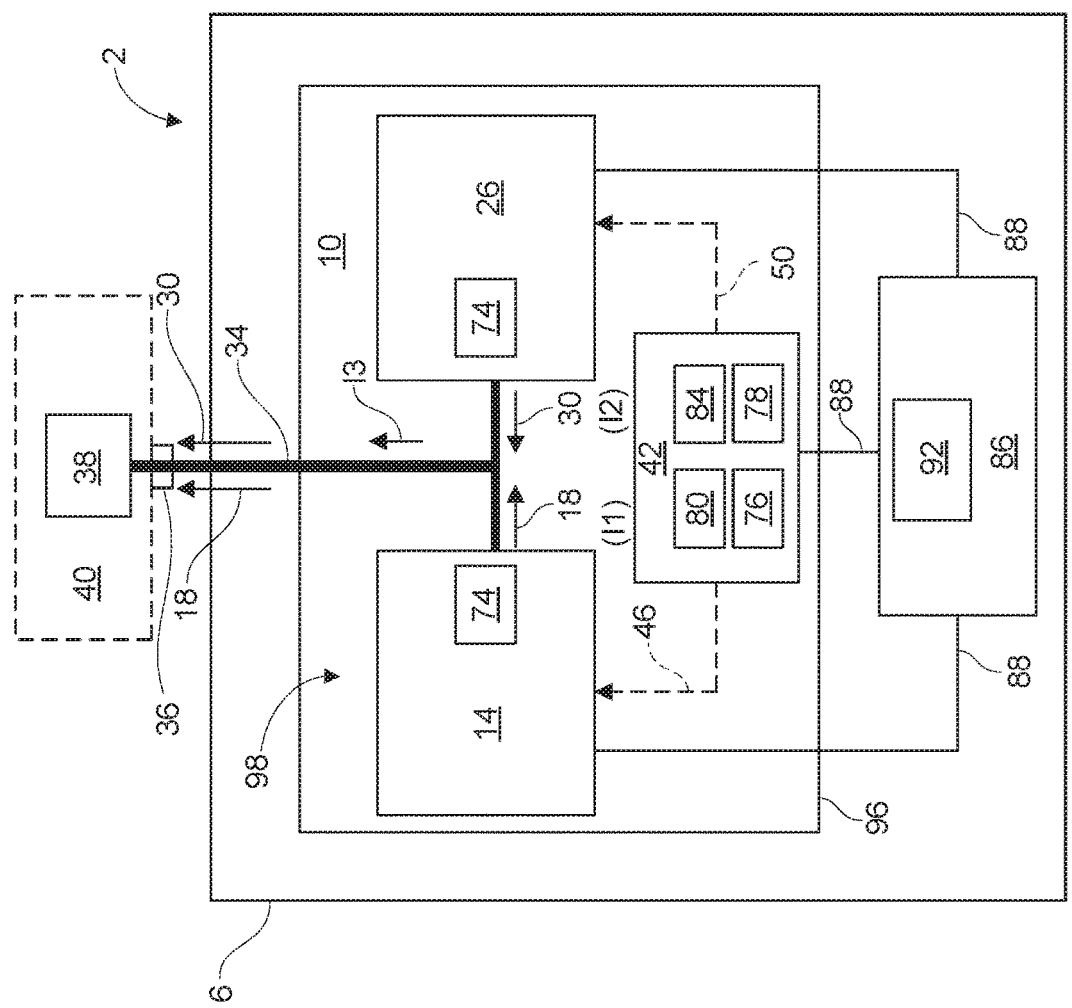
FIG. 1 is a schematic diagram of an arc fault circuit interrupt (AFCI) tester device according to an embodiment of the disclosure.

FIG. 1 is a schematic diagram of an arc fault circuit interrupt (AFCI) tester device (e.g., an AFCI tester device (2)) according to an embodiment of the disclosure. AFCI tester device (2) includes a housing (6) and a circuit assembly (10) disposed within the housing (6). In an example, circuit assembly (10) includes a circuit plate (96). In an example, circuit assembly (10) includes a printed circuit board (98).

Figure 3A:
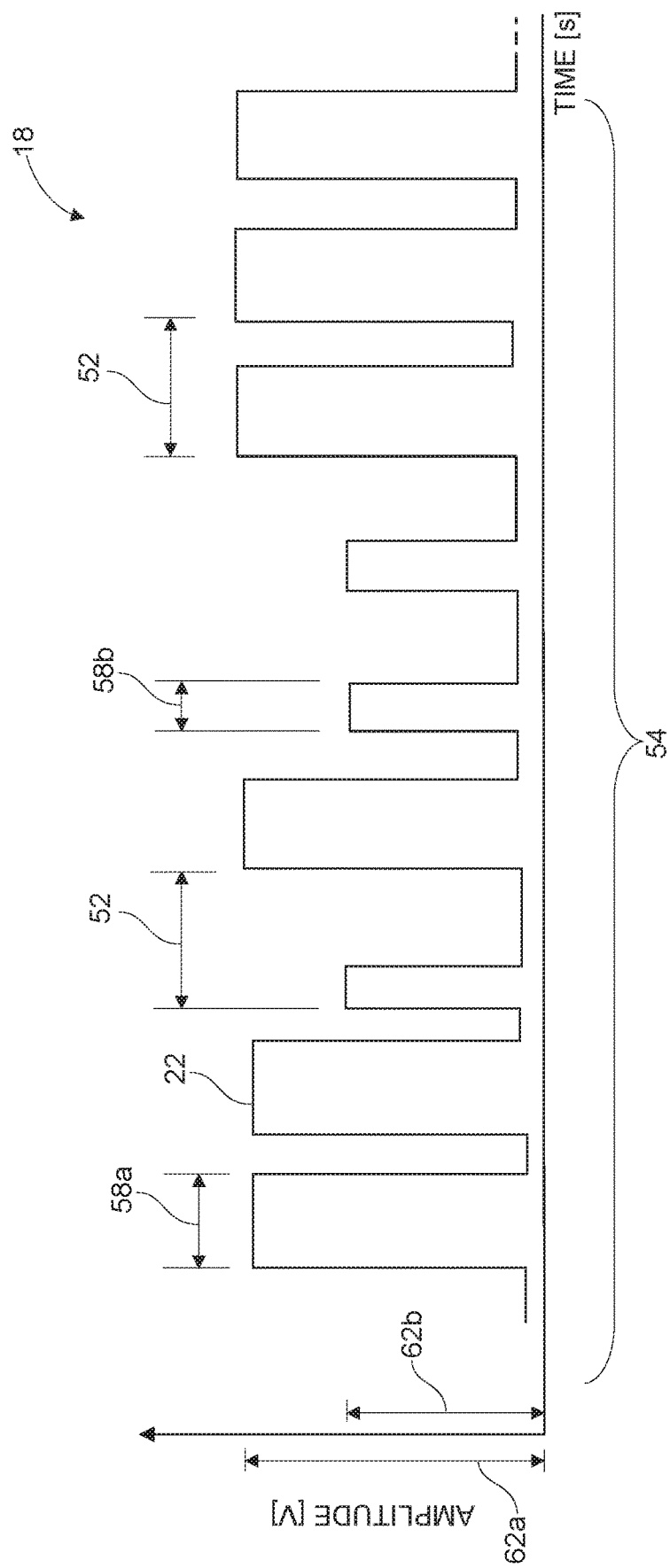
FIG. 3A is a plot of a pulse pattern induced by a first switching circuit of the AFCI tester device of FIG. 1 according to an embodiment of the disclosure.
Figure 3B:
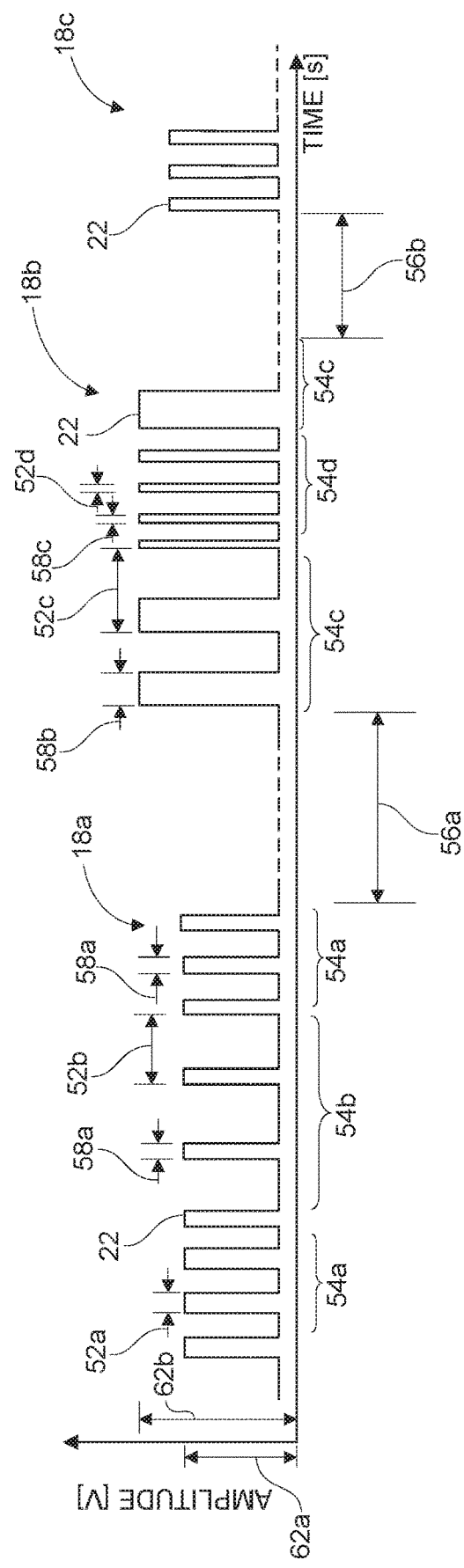
FIG. 3B is a plot of pulse patterns induced by the first switching circuit of the AFCI tester device of FIG. 1 according to an embodiment of the disclosure.

The circuit assembly (10) includes a first load switching circuit (14) for creating (e.g., inducing) a pulse pattern (18) having a plurality of pulses (22) (shown in FIGS. 3A-3C). Circuit assembly (10) includes a second load switching circuit (26) for creating (e.g., inducing) an overlay signal (30) superimposed upon at least one pulse (22) of the plurality of pulses (22). The AFCI tester device (2) includes an interface (34) for connecting the variable switched loads (e.g., for receiving and further transmitting the plurality of pulses (22) and the overlay signal (30) to an AFCI device under test (DUT) (38)).

The interface (34) extends outside of the housing (6) and is adapted for electrically coupling the circuit assembly (10) to the AFCI DUT (38). The interface (34) is adapted to connect the variable switched load and to transmit the pulse pattern (18) (18) and the overlay signal (30) to the AFCI DUT (38). In an example, the interface (34) is adapted for coupling the first (14) and second (26) load switching circuits to the AFCI DUT (38), and is also adapted for connecting the variable switched load and transmitting the pulse pattern (18) and the overlay signal (30) to the AFCI DUT (38). In an example, the interface (34) includes a connector (36) to facilitate electrically coupling the circuit assembly (10) and the first (14) and second (26) load switching circuits to the AFCI DUT (38) through, for example and without limitation, a wall outlet (not shown in FIG. 1) of an electrical installation (40) (e.g., of a home or other building or facility). In an example, the interface (34) is adapted to enable the variable load (e.g., the pulse pattern (18) and the overlay signal (30) to be connected across and transmitted to the AFCI DUT (38) via hot and neutral wires connecting the AFCU DUT (38) to the interface (34).

In an example, the first load switching circuit (14) includes one or more transistors (74). In another example, the second load switching circuit (26) includes one or more transistors (74). In yet another example, the first load switching circuit (14) includes transistor(s) (74) and the second load switching circuit (26) includes transistor(s) (74).

The AFCI tester device (2) includes logic circuitry (42) coupled to the first (14) and second (26) load switching circuits of the circuit assembly (10). The logic circuitry (42) is configured to transmit a first control signal (46) to the first load switching circuit (14) to facilitate creating (e.g., inducing) the pulse pattern (18). The logic circuitry (42) is configured to transmit a second control signal (50) to the second load switching circuit (26) to facilitate creating (e.g., inducing) the overlay signal (30).

In an example, AFCI tester device (2) includes a power supply (86) disposed within the housing (6). In an example, power supply (86) includes a battery (92). Power supply (86) is coupled to logic circuitry (42) and is configured to provide power (88) thereto (e.g., as a direct current). In an example, power supply (86) is coupled to the first load switching circuit (14) and is configured to provide power (88) thereto. In another example, power supply (86) is coupled to the second load switching circuit (26) and is configured to provide power (88) thereto. In yet another example, power supply (86) is coupled to the first (14) and second (26) load switching circuits and is configured to provide power (88) thereto. In yet another example, logic circuitry (42), and/or one or both of first (14) and/or second (26) load switching circuit(s) may receive power supplied by a circuit under test which contains the AFCI DUT (38).

In an example, logic circuitry (42) includes a first oscillator (76). In the example, the first oscillator (76) is configured to generate a first clock pulse at a first frequency to facilitate creating the pulse pattern (18) by the first load switching circuit (14). In the example, the first frequency of the first clock pulse generated by the first oscillator (76) is divided and/or otherwise modified (e.g., decreased in frequency) by additional components of logic circuitry (42) (not shown in FIG. 1) to a frequency value that is different from the first frequency. In an example, logic circuitry (42) includes a second oscillator (78). In the example, the second oscillator (78) is configured to generate a second clock pulse at a second frequency to facilitate creating the overlay signal (30) by the second load switching circuit (26). In the example, the second frequency of the second clock pulse generated by the second oscillator (76) is divided and/or otherwise modified (e.g., decreased in frequency) by additional components of logic circuitry (42) (not shown in FIG. 1) to a frequency value that is different from the second frequency. In an example, logic circuitry (42) includes first oscillator (76) and second oscillator (78).

In an example, logic circuitry (42) includes a processor (80) and a memory (84). In the example, processor (80) executes processor-readable instructions encoded as software and/or firmware stored in a non-transient processor-readable medium of memory (84). In the example, processor (80) executes the processor-readable instructions to facilitate transmitting the first control signal (46) to, and creating the pulse pattern (18) by, the first load switching circuit (14). In an example, processor (80) facilitates transmitting the first control signal (46) to, and inducing the pulse pattern (18) by, the second switching circuit (16), including, without limitation, in conjunction with the first oscillator (76). In another example, logic circuitry (42) does not include first (76) and/or second (78) oscillator(s), and processor (80) facilitates transmitting the first (46) and/or second (50) control signal(s) and creating the pulse pattern (18) and/or overlay signal (30) by generating, dividing, and/or otherwise modifying the first and/or second clock pulse(s) without first (76) and/or second (78) oscillator(s), respectively.

In an example, processor (80) executes the processor-readable instructions to facilitate transmitting the second control signal (50) and creating the overlay signal (30). In an example, processor (80) facilitates transmitting the second control signal (50) and creating the overlay signal (30) in conjunction with the second oscillator (78). In another example, logic circuitry (42) does not include second oscillator (78), and processor (80) facilitates transmitting the second control signal (50) and creating the overlay signal (30) by generating, dividing, and/or otherwise modifying the second clock pulse without second oscillator (78). In an example, processor (80) executes the processor-readable instructions to facilitate transmitting first (46) and second (48) control signals and creating pulse pattern (18) and overlay signal (30), respectively.

Figure 2:
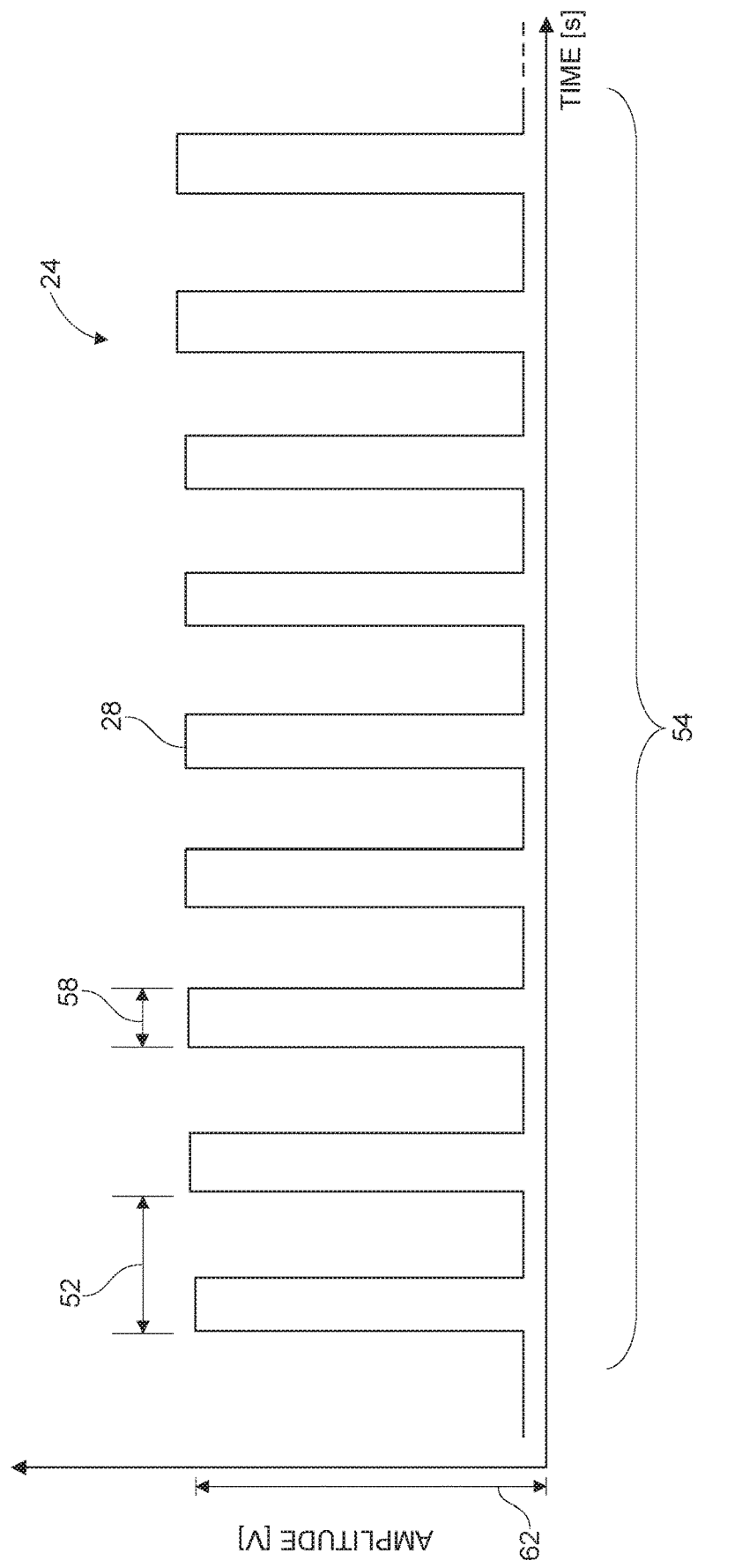
FIG. 2 is a plot of a signal waveform generated by a known AFCI tester device.

FIG. 2 is a plot of a signal waveform generated by a known AFCI tester device. In the known AFCI tester device, a known pulse pattern (24) is generated and transmitted to an AFCI DUT. As shown in FIG. 2, pulse pattern (24) includes a plurality of known pulses (28). The known pulse pattern (24) has a pulse frequency (54) that is equal to the reciprocal of period (52) of the pulse pattern (24) waveform. In the known pulse pattern (24), each pulse (28) of the plurality of pulses (28) has substantially equal pulse widths (58) and pulse amplitudes (62). In the known pulse pattern (24), duty cycles of all waveform periods (52) are substantially equal.

As used herein, the terms "substantially equal," "substantially equivalent," and the like mean that two or more values are equivalent in value to the extent of a measurement error by an observer, instrument, or other measurement tool or technique. For instance, two values of a first physical characteristic may be substantially equal to one another when their measured values are within 10% of one another. Also, for example, two values of a second physical characteristic may be substantially equal to one another when their measured values are within 1% of one another. As a further example, two values of a third physical characteristic may be substantially equal to one another when their measured values are within 0.001% of one another. As will be understood and appreciated by those possessing ordinary skill in the art, two values of a physical characteristics may be deemed substantially equivalent when those values are obtained using a first measurement tool or method, but those two values may be deemed to be not substantially equivalent when obtained by a second measuring tool or method different from the first.

Referring now to FIGS. 3A-3C, the logic circuitry (42) is configured to transmit the first control signal (46) to the first load switching circuit (14) to facilitate at least one of: creating (e.g., inducing) the pulse pattern (18) at one or more predetermined pulse frequencies (54); creating the plurality of pulses (22) at one or more predetermined pulse widths (58); and creating the plurality of pulses (22) at one or more predetermined pulse amplitudes (62). As shown in FIG. 3D, the logic circuitry (42) is configured to transmit the second control signal (50) to the second load switching circuit (26) to facilitate at least one of: creating (e.g., inducing) the overlay signal (30) at one or more predetermined signal frequencies (66); and creating the overlay signal (30) at one or more predetermined signal amplitudes (70). In an example, as shown in FIGS. 3A and 3C, a period (52) of the pulse pattern (18) may be substantially equal for each pulse (22) of the plurality of pulses (22) in a single pulse pattern (18). In another example, as shown in FIG. 3B, a first period (52a) of one or more pulses (22) of a pulse pattern (18) may be less than a second period (52b) of another pulse (22) in the same pulse pattern (18).

In an example, as shown in FIGS. 3A and 3B, at least one pulse (22) of the plurality of pulses (22) has a pulse width (58) that is less than a pulse width (58) of at least one other pulse (22) of the plurality of pulses (22). In another example, as shown in FIGS. 3A and 3B, at least one pulse (22) of the plurality of pulses (22) has a pulse amplitude (62) that is less than a pulse amplitude (62) of at least one other pulse (22). In yet another example, as shown in FIGS. 3A and 3B, at least one pulse (22) of the plurality of pulses (22) has: a pulse width (58) that is less than a pulse width (58) of at least one other pulse (22) of the plurality of pulses (22); and has a pulse amplitude (62) that is less than a pulse amplitude (62) of at least one other pulse (22).

In an example, as shown in FIG. 3C, all pulses (22) of the plurality of pulses (22) have substantially equal pulse widths (58). In another example, as shown in FIG. 3C, all pulses (22) of the plurality of pulses (22) have substantially equal pulse amplitudes (62). In yet another example, as shown in FIG. 3C, all pulses (22) of the plurality of pulses have: substantially equal pulse widths (58); and have substantially equal pulse amplitudes (62). In an example, as shown in FIG. 3D, the overlay signal (30) has a signal frequency (66) that is greater than the pulse frequency (54).

In an example, as shown in FIG. 3E, the overlay signal (30) is superimposed upon two or more pulses (22) of the plurality of pulses (22). In an example, as shown in FIG. 3D, the overlay signal (30) created by the second load switching circuit (26) includes a first overlay signal (30a) and a second overlay signal (30b). In one embodiment of the example, as shown in FIG. 3D, a signal frequency (66a) of the first overlay signal (30a), which is superimposed on one pulse (22) of the plurality of pulses (22), is less than a signal frequency (66b) of a second overlay signal (30b), which is superimposed on another pulse (22) of the plurality of pulses (22) (as shown in in FIG. 3E). In another embodiment of the example, as shown in FIG. 3D, a signal amplitude (70) of the first overlay signal (30a) is less than a signal amplitude (70) of the second overlay signal (30b). In yet another embodiment of the example: the signal frequency (66a) of the first overlay signal (30a), which is superimposed on one pulse (22) of the plurality of pulses (22), is less than a signal frequency (66) of a second overlay signal (30b), which is superimposed on another pulse (22) of the plurality of pulses (22); and the signal amplitude (70a) of the first overlay signal (30a) is greater than the signal amplitude (70b) of the second overlay signal (30b). In still another example, the overlay signal (30) is superimposed upon all pulses (22) of the plurality of pulses (22), as shown in the plurality of resultant pulses (68) of the superimposed signal (64) shown in FIG. 3E.

In an example, as shown in FIG. 3E, a superimposed amplitude (72) of resultant pulses (68) of the superimposed signal (64) is a function of pulse amplitude (62) and signal amplitude (70) of pulses (22) and overlay signal (30), respectively. In an example, superimposed amplitude (72) is greater than pulse amplitude (62). In another example, superimposed amplitude (72) is less than pulse amplitude (62). In yet another example, superimposed amplitude (72) is substantially equal to pulse amplitude (62). In still another example, superimposed amplitude (72) is substantially equal to a sum of pulse amplitude (62) and signal amplitude (70). In another example, superimposed amplitude (72) is greater than pulse amplitude (62) and less than the sum of pulse amplitude (62) and signal amplitude (70).

In an example, as shown in FIGS. 3C-3E, at least one pulse (22) of pulse pattern (18) does not get superimposed with a respective overlay signal (30). In the example shown in FIGS. 3C-3E, pulse pattern (18) has seven pulses (22), and the fifth and sixth pulses (22) do not get superimposed with respective overlay signals (30). As such, the fifth and sixth resultant pulses (68) of superimposed signal (64) are transmitted to AFCU DUT (38) in a substantially equivalent form as created by first switching load circuit (14).

In an example, as shown in FIG. 3B, a plurality of pulse patterns (e.g., 18a, 18b, and 18c) may be created by first load switching circuit (14), and each of the plurality of pulse patterns (18) may have varying pulse (22) and other intra- and inter-pulse pattern (18) characteristics, including, without limitation, those shown and described above with reference to FIGS. 3A-3C. In an example, an inter-pulse pattern (18) characteristic includes an inter-pulse pattern delay time (56). In an example, as shown in FIG. 3B, a first delay time (56a) between a first (18a) and a second (18b) pulse pattern is greater than a second delay time (56b) between the second (18b) and a third (18c) pulse pattern. In another example, delay time(s) (56) between pulse patterns (18) are substantially equal. In an example, an inter-pulse pattern (18) characteristic includes an inter-pulse pattern pulse number. In an example, as shown in FIG. 3B, where two or more pulse patterns (18) are created by first load switching circuit (14) and transmitted to AFCU DUT (38), a number of pulses (22) in a first pulse pattern (18a) may be different from a number of pulses (22) in a second pulse pattern (18b). In another example, where two or more pulse patterns (18) are induced and transmitted as described herein, each of the pulses patterns (18) include the same number of pulses (22).

Figure 4:
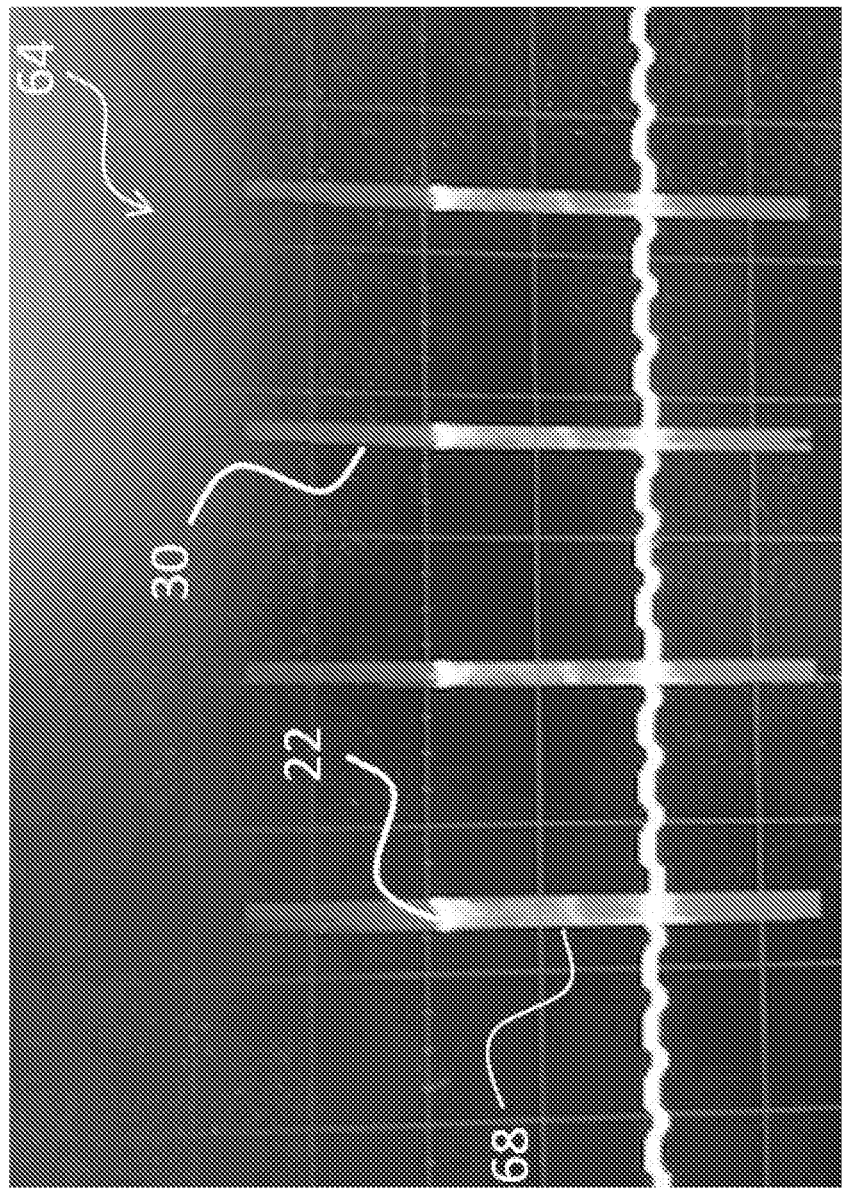
FIG. 4 is a plot of a superimposed load pattern transmitted as a superimposed signal to an AFCI DUT by the AFCI tester device of FIG. 1 according to an embodiment of the disclosure.
Figure 5:
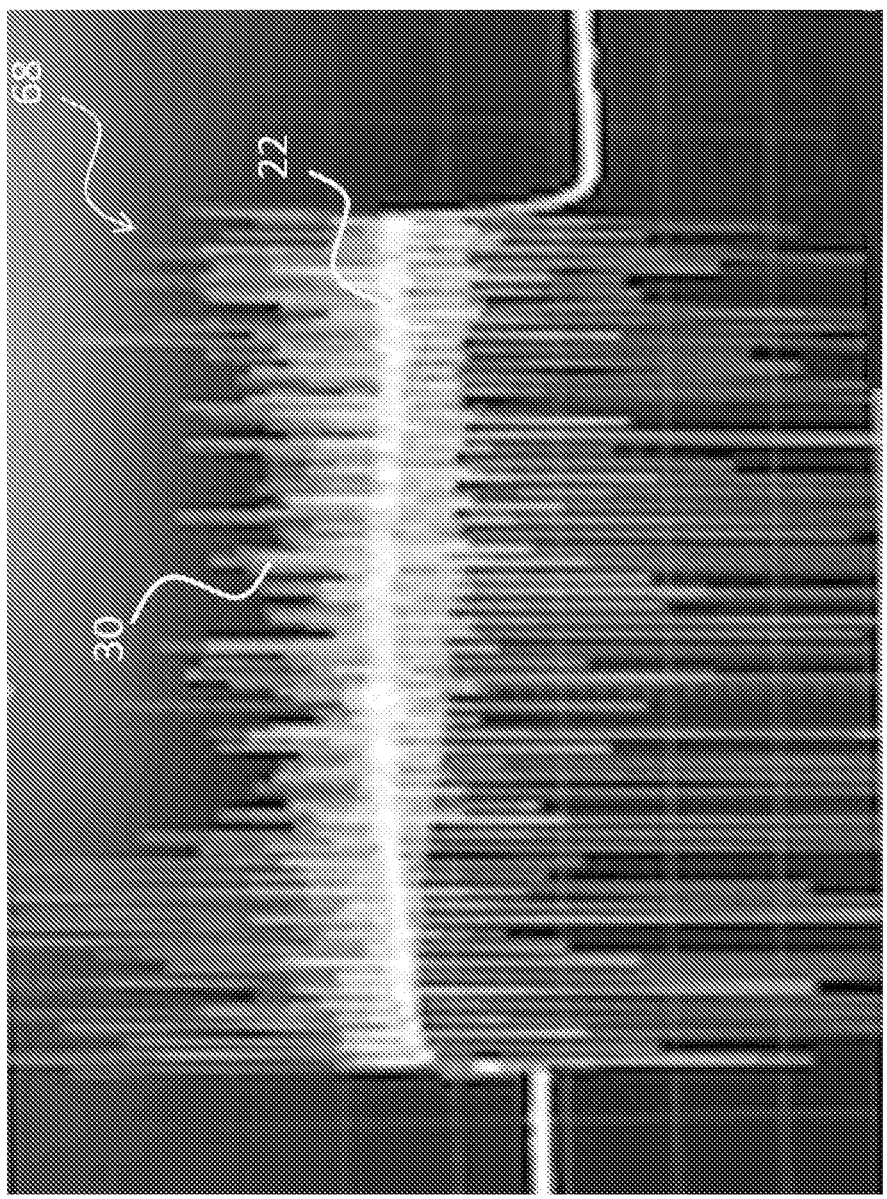
FIG. 5 is a magnified view of one resultant pulse of the plot shown in FIG. 4 according to an embodiment of the disclosure.

FIG. 4 is a plot of a superimposed signal transmitted to an AFCI DUT by the AFCI tester device of FIG. 1 according to an embodiment of the disclosure. FIG. 5 is a magnified view of a plot of one resultant pulse of the plot shown in FIG. 4 according to an embodiment of the disclosure. As shown in FIG. 4, a pulse pattern (18) having four pulses (22) was created by the first load switching circuit (14) and transmitted, via interface (34) to an oscilloscope instrument. Concurrently with the first load switching circuit (14) creating and transmitting the pulse pattern (18), second switching circuit (26) created and transmitted, via interface (34), overlay signal (30) to the oscilloscope. In the example, as shown in FIG. 5, overlay signal (30) is superimposed on the pulse (22) to form the resultant pulse (68). In an example, as shown in FIGS. 4 and 5, superimposing overlay signal (30) upon pulse (22) introduces time varying noise to the resultant pulse (68). In the example, resultant pulses (68) having this noise-like quality further facilitates tripping AFCI DUT (68) by simulating the actual conditions found in circuits containing AFCI DUT (68) during actual electrical arc faults.

Figure 6:
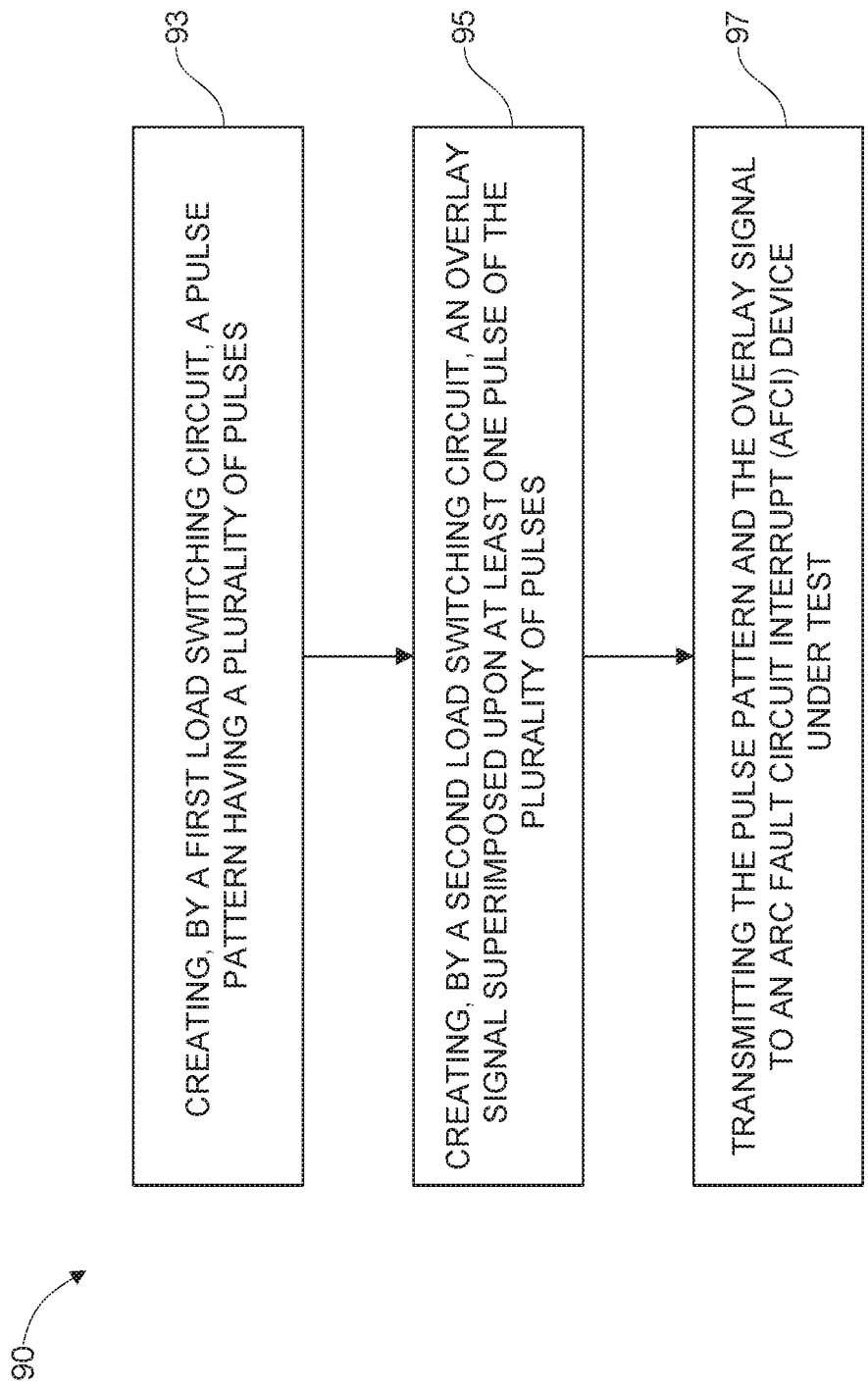
FIG. 6 is a flowchart of a method for testing an AFCI according to an embodiment of the disclosure.

FIG. 6 is a flowchart of a method for testing an AFCI (e.g., a method (90)) according to an embodiment of the disclosure. In an example, the steps of method (90) shown and described with reference to FIG. 6 are implemented, at least in part, using the AFCI tester device (2) shown and described above with reference to FIGS. 1-5. Method (90) includes creating (93), by first load switching circuit (14), a pulse pattern (18) having a plurality of pulses (22). Method (90) includes creating (95), by second load switching circuit (26), an overlay signal (30) superimposed upon at least one pulse (22) of the plurality of pulses (22). Method (90) includes transmitting (97) the pulse pattern (18) and the overlay signal (30) to AFCI DUT (38).

Given the increasing number of makes and models of AFCI devices and the attendant increasing variety of UL 1699-compliant test protocols required to trip AFCIs, the disclosed AFCI test devices and methods beneficial enable simulating actual arc conditions required for tripping a wide variety of AFCI devices with minimal experimentation, time, and associated costs.

Figure 7:
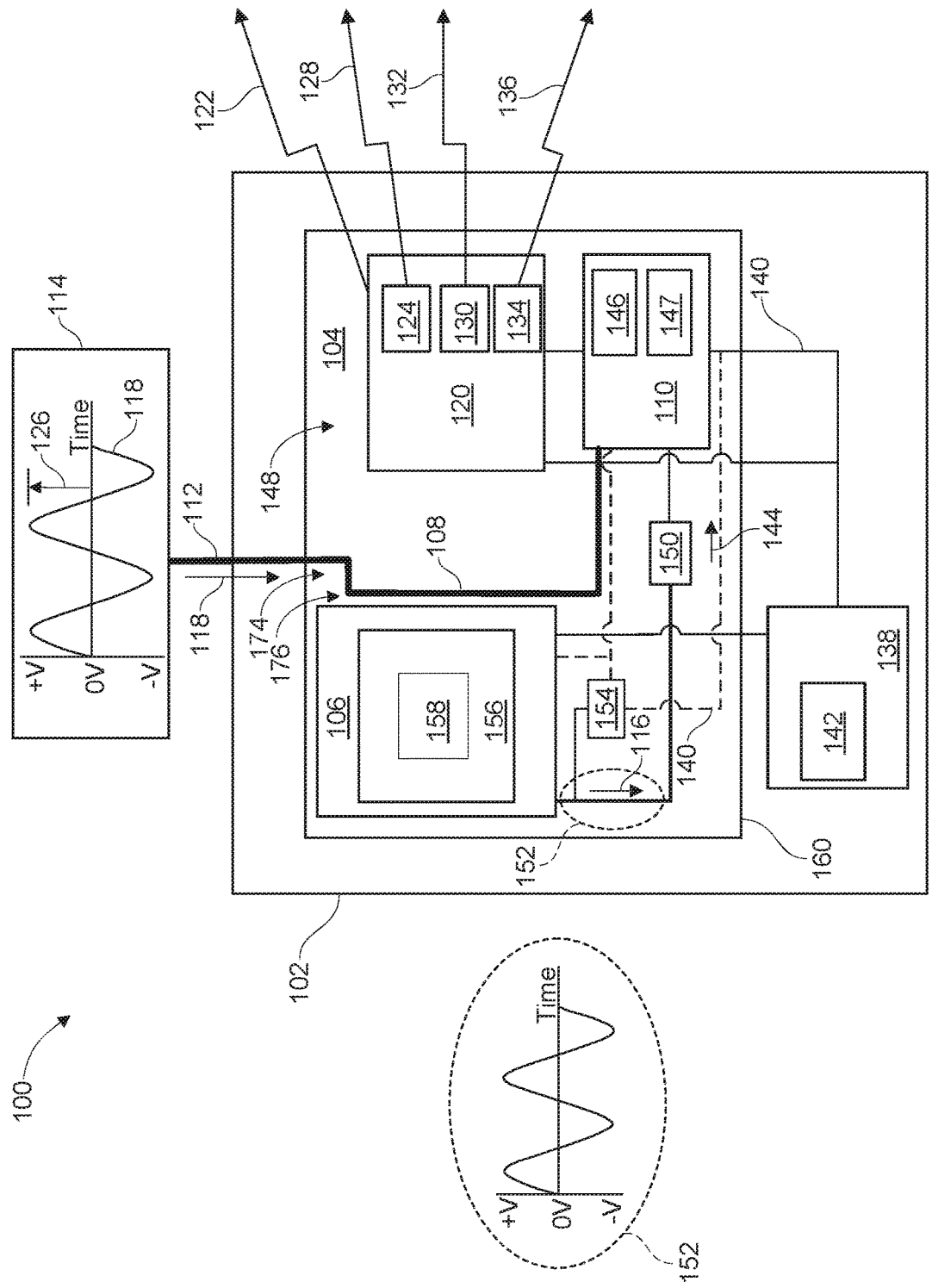
FIG. 7 is a schematic diagram of a circuit test device according to an embodiment of the disclosure.

FIG. 7 is a schematic diagram of a circuit test device (e.g., a circuit test device (100)) according to an embodiment of the disclosure. The circuit test device (100) includes a housing (102) and a circuit (104) disposed in the housing (102). In an example, circuit (104) includes a circuit plate (148). In an example, circuit (104) is or includes a printed circuit board (160). The circuit (104) includes an electromagnetic field (EMF) sensor (106). The circuit (104) includes a conductor (108) positioned proximal the EMF sensor (106). Circuit (104) includes a signal detector (110) coupled to the EMF sensor (106). In an example, the signal detector (110) includes a processor (146), a memory (147), and a microcontroller (not shown in FIG. 7).

In an example, circuit test device (100) includes a power supply (138) disposed in the housing (102) and coupled to the signal detector (110). In the example, the power supply (138) is configured to provide power (140) to the signal detector (110) (e.g., as a direct current (144)). In an example, the power supply (138) includes a battery (142). In an example, the power supply (138) is coupled to EMF sensor (106) and is further configured to transmit a flow of direct current (144) to the EMF sensor (106)

Circuit test device (100) includes an interface (112) connected to the circuit (104) and extending through the housing (102). The interface (112) is adapted for coupling the circuit to a circuit under test (CUT) (114). In an example, circuit test device (100) includes a conductor (108) disposed in the housing (102). In the example, the conductor (108) is coupled to interface (112) and the interface (112) is further adapted for coupling conductor (108) to the CUT (114).

In an example, the EMF sensor (106) is configured to: generate a signal (116) in the presence of a time varying flow of current (118) from the CUT (114) in the circuit (104), and provide the signal (116) to the signal detector (110). In an example, the EMF sensor (106) is positioned proximal interface (112). In one embodiment, the EMF sensor (106) is further positioned in the absence of contact (174) between the interface (112) and the EMF sensor (106). In another embodiment, the EMF sensor (106) is positioned in contact with at least a portion of the interface (112).

In embodiments including the conductor (108), the EMF sensor (106) is further configured to generate the signal (116) in the presence of a time varying flow of current (118) from the CUT (114) in the conductor (108). In an example, the EMF sensor (106) is positioned proximal conductor (108). In one embodiment, the EMF sensor (106) is further positioned in the absence of contact (174) between the conductor (108) and the EMF sensor (106). In another embodiment, the EMF sensor (106) is positioned in contact with at least a portion of the conductor (108).

In an example, the EMF sensor (106) includes an antenna (156). In the example, the antenna (156) includes a conductive pad (158). In an example, circuit (104) includes an amplifier (150) coupled to the EMF sensor (106) and coupled to the signal detector (110). The amplifier (150) is configured to amplify the signal (116) prior to receipt thereof by signal detector (110).

In an example, circuit test device (100) includes a power supply (138) disposed in the housing (102) and coupled to the signal detector (110). In the example, the power supply (138) is configured to provide power (140) to the signal detector (110) (e.g., as a direct current (144)). In an example, the power supply (138) includes a battery (142). In an example, the power supply (138) is coupled to EMF sensor (106) and is further configured to transmit a flow of direct current (144) to the EMF sensor (106). In an example, the power supply (138) is coupled to indicator (120) and is further configured to transmit a flow of direct current to the indicator (120).

The circuit test device (100) includes an indicator (120) coupled to the signal detector (110). The indicator is configured to provide an indication (122) in response to the signal (116). In an example, the indicator (120) includes at least one illuminator (124) coupled to the signal detector (110) and visible externally from the housing (102). In the example, the signal detector (110) is configured to activate the illuminator (124) when the signal (116) is present. In an example, the illuminator (124) is a light emitting diode. In another example, the illuminator (124) is an incandescent bulb.

In an example, the signal (116) includes information indicative of a magnitude (126) of the time varying flow of current (118). In the example, the illuminator (124) is configured to provide variable illumination (128) selectively in at least one of a brightness, a color, and a blinking frequency. In the example, the variable illumination (128) depends on the magnitude (126). In an example, the illuminator (124) provides the illumination (128) when signal (116) is present and does not provide the illumination (128) in the absence of signal (116). In the example, illuminator (124) increases the brightness of illumination (128) in proportion to the magnitude (126). In an example, illuminator (124) provides the illumination (128) at a first color when signal (116) is present (e.g., red) and provides the illumination (128) at a second color in the absence of signal (116) (e.g., green). In an example, illuminator (124) increases the blinking frequency of illumination (128) in proportion to the magnitude (126) or a frequency of the time varying flow of current (118).

In an example, the indicator (120) includes a display (130) coupled to the signal detector (110) and visible externally from the housing (102). In the example, the signal detector (110) is configured to change a display configuration (132) of the display (130) in response to the signal (116). In an example, the signal (116) includes information indicative of the magnitude (126) of the time varying flow of current (118). In the example, the signal detector (110) is further configured to change a display configuration (132) based on the magnitude (126). In an example, the display configuration (132) includes a value of the magnitude (126) (e.g., a root mean square (RMS) voltage value) that a user of circuit test device (100) may view, and which changes with variations in the value of the magnitude (126). In another example, the display configuration (132) includes a at least two symbols (e.g., + and −) that the user may view, and which change from a first symbol displayed on display (130) when the signal (116) is not present (e.g., −) to a second symbol in response to signal (116) being present (e.g., +).

In an example, the indicator (120) includes at least one speaker (134) coupled to the signal detector (110). In the example, the speaker (134) is operable to generate one or more audible sounds (136) in response to the signal (116). In an example, the signal (116) includes information indicative of the magnitude (126) of the time varying flow of current (118). In the example, the one or more audible sounds (136) are adjustable by the signal detector (110) and depend on the magnitude (126). In an example, the speaker (134) generates a first audible sound in the presence of signal (116) (e.g., "live") and generates a second audible sound in the absence of signal (116) (e.g., "not live"). Alternatively, speaker (134) generates an audible sound in the presence of signal (116) (e.g., "live") and generates no other audible sound in the absence of signal (116). In an example, the signal (116) is indicative of a time varying flow of detector current (152).

In an example, the circuit (104) includes a power converter (154) coupled to at least one of: the signal detector (110), the EMF sensor (106), the indicator (120), and the power supply (138). In the example, the power converter (154) is configured to receive at least a portion of the detector current (152) for providing power (140) to at least one of signal detector (110), EMF sensor (106), signal detector (110), and indicator (120). In an example, the power converter (154) is further configured to transmit a flow of direct current (144) to the power supply (138) to, for instance, charge a rechargeable battery (142).

Figure 8:
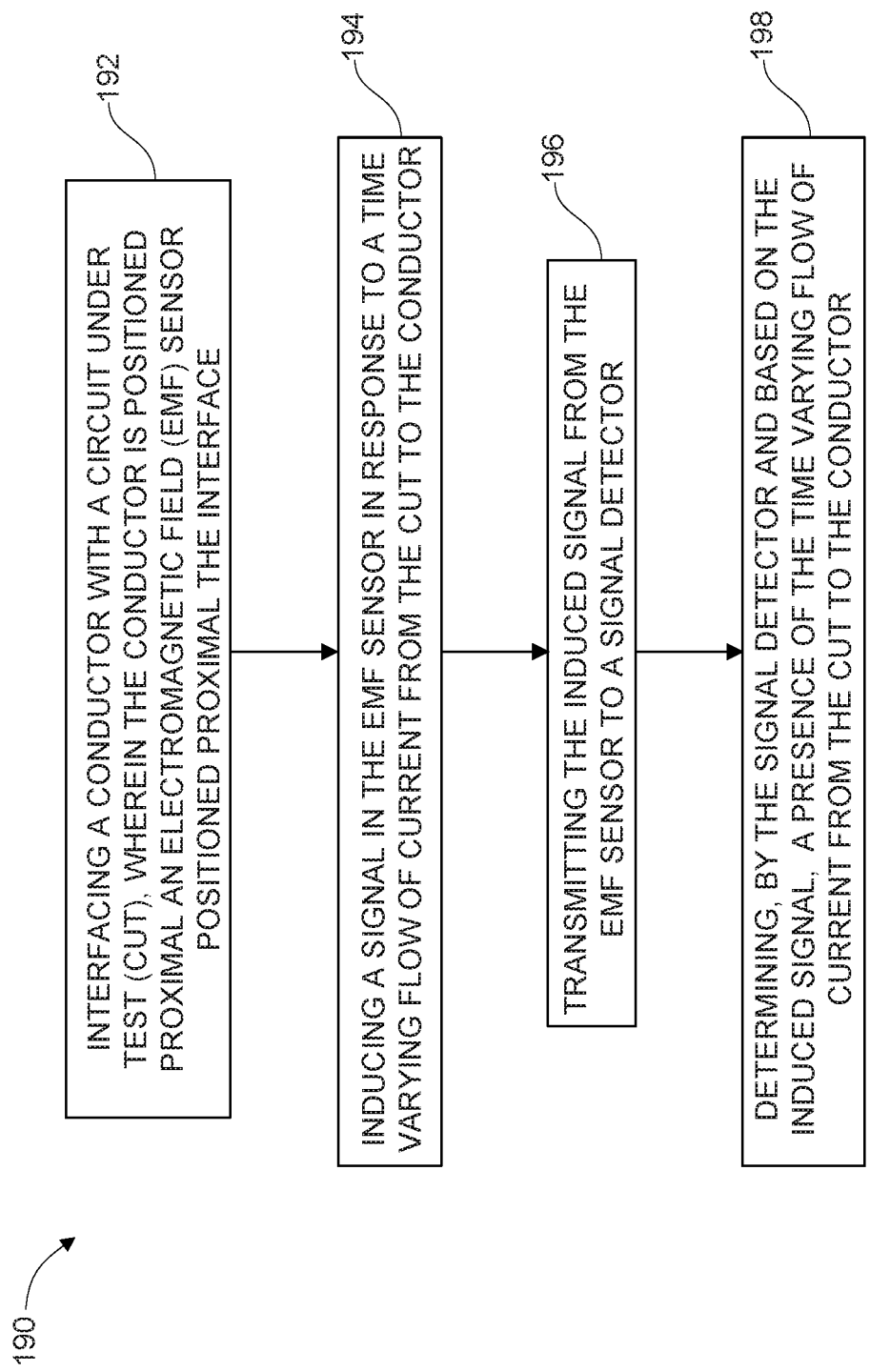
FIG. 8 is a flowchart of a method for testing a circuit according to an embodiment of the disclosure.

FIG. 8 is a flowchart of a method (e.g., a method (190)) for testing a circuit according to an embodiment of the disclosure. In an example, the steps of method (190) shown and described with reference to FIG. 8 are implemented, at least in part, using the circuit test device (100) shown and described above with reference to FIG. 7. In an example, the steps of method (180) shown and described with reference to FIG. 8 are implemented, at least in part, using circuit (104) shown and described above with reference to FIG. 7. Method (190) includes interfacing (192) a conductor (108) with a circuit under test (CUT) (114), where the conductor (108) is positioned proximal an electromagnetic field (EMF) sensor (106). Method (190) includes inducing (194) a signal (116) in the EMF sensor (106) in response to a time varying flow of current (118) from the CUT (114) to the conductor (108). Method (190) includes transmitting (196) the induced signal (116) from the EMF sensor (106) to a signal detector (110). Method (190) includes determining (198), by the signal detector (110) and based on the induced signal (116), a presence of the time varying flow of current (118) from the CUT (114) to the conductor (108).

Figure 9:
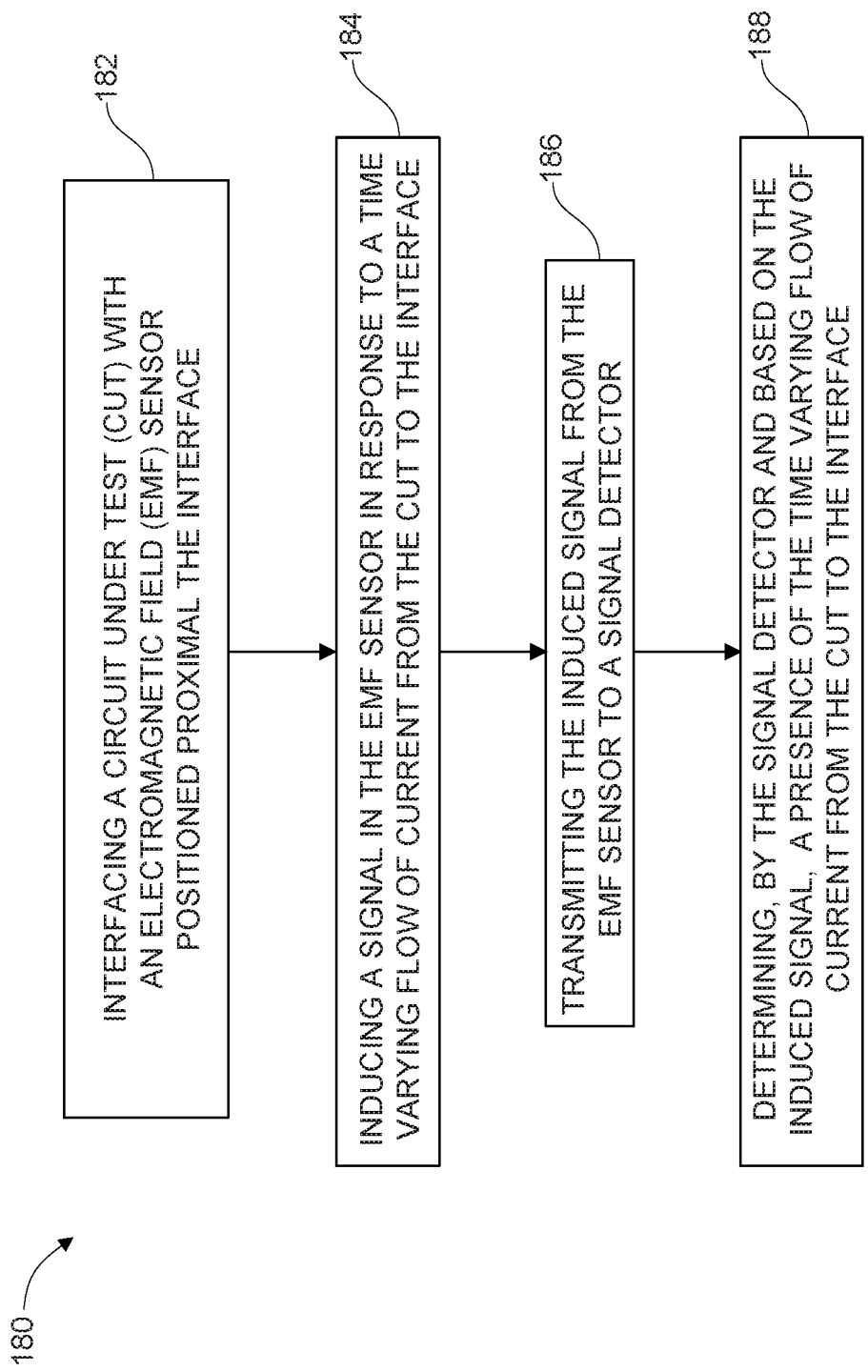
FIG. 9 is a flowchart of a method for testing a circuit according to an embodiment of the disclosure.

FIG. 9 is a flowchart a method (e.g., a method (180)) for testing a circuit according to an embodiment of the disclosure. In an example, the steps of method (180) shown and described with reference to FIG. 9 are implemented, at least in part, using circuit test device (100) shown and described above with reference to FIG. 7. In an example, the steps of method (180) shown and described with reference to FIG. 9 are implemented, at least in part, using circuit (104) shown and described above with reference to FIG. 7. Method (180) includes interfacing (182), by interface (112), a circuit under test (CUT) (114) with electromagnetic field (EMF) sensor (106). The EMF sensor (106) is positioned proximal the interface (112). Method (180) includes inducing (184) a signal (116) in the EMF sensor (106) in response to a time varying flow of current (118) from the CUT (114) to the interface (112). Method (180) includes transmitting (186) the induced signal (116) from the EMF sensor (106) to signal detector (110). Method (180) includes determining (188), by the signal detector (110) and based on the induced signal (116), a presence of the time varying flow of current (118) from the CUT (114) to the interface (112).

In an example, the AFCI tester device (2) shown and described above with reference to FIGS. 1-6 may include all or part of the functionality and additional components and features of the circuit test device (100) shown and described above with reference to FIGS. 7 and 8. In an example, the AFCI tester device (2) described herein may include additional functionality and components, including, without limitation, for providing voltmeter, ammeter, and/or multimeter functions, among others, to AFCI tester device (2). Likewise, in an example, the circuit test device (100) shown and described above with reference to FIGS. 7 and 8 may include all or part of the functionality and additional components and features of the AFCI tester device (2) shown and described above with reference to FIGS. 1-6. In an example, the circuit test device (100) described herein may include additional functionality and components, including, without limitation, for providing voltmeter, ammeter, and/or multimeter functions, among others, to circuit test device (100). In an example, additional functionality and structural features may be included in the disclosed AFCI test devices (e.g., device (2)) and methods (e.g., method (90)), including for example, and without limitation, the systems, devices, and methods disclosed in International Patent Application No. PCT/US2019/015620 ("Circuit Energization Status Test Device and Method"; Inventors: Bruce Kuhn & Christian A. Castro; filed on Jan. 29, 2019), which is incorporated by reference herein in its entirety.

Aspects of the present disclosure will now be described with reference to the following numbered clauses:

1. An arc fault circuit interrupt (AFCI) tester device, including:
   a housing;
   a circuit assembly disposed within the housing and including:
      a first load switching circuit for creating a pulse pattern having a plurality of pulses; and
      a second load switching circuit for creating an overlay signal superimposed upon at least one pulse of the plurality of pulses; and
   an interface receiving the plurality of pulses and the overlay signal, the interface extending outside of the housing and adapted for electrically coupling the circuit assembly to an AFCI device under test (DUT), the interface adapted to transmit the pulse pattern and the overlay signal to the AFCI DUT.

2. The AFCI tester device of clause 1, further including logic circuitry coupled to the first and second load switching circuits of the circuit assembly, the logic circuitry being configured to:
   transmit a first control signal to the first load switching circuit to facilitate creating the pulse pattern; and
   transmit a second control signal to the second load switching circuit to facilitate creating the overlay signal.

3. The AFCI tester device of any of the preceding clauses, where the logic circuitry is further configured to:
   (a) transmit the first control signal to the first load switching circuit to facilitate at least one of:
      creating the pulse pattern at one or more predetermined pulse frequencies;
      creating the plurality of pulses at one or more predetermined pulse widths; and
      creating the plurality of pulses at one or more predetermined pulse amplitudes; and
   (b) transmit the second control signal to the second load switching circuit to facilitate at least one of:
      creating the overlay signal at one or more predetermined signal frequencies; and
      creating the overlay signal at one or more predetermined signal amplitudes.

4. The AFCI tester device of any of the preceding clauses, where at least one pulse of the plurality of pulses has at least one of:
   a pulse width that is less than a pulse width of at least one other pulse of the plurality of pulses; and
   a pulse amplitude that is less than a pulse amplitude of the at least one other pulse.

5. The AFCI tester device of any of the preceding clauses, where all pulses of the plurality of pulses have at least one of:
   substantially equal pulse widths; and
   substantially equal pulse amplitudes.

6. The AFCI tester device of any of the preceding clauses, where the pulse pattern has a pulse frequency, and where the overlay signal has a signal frequency that is greater than the pulse frequency.

7. The AFCI tester device of any of the preceding clauses, where the overlay signal is superimposed upon two or more pulses of the plurality of pulses.

8. The AFCI tester device of any of the preceding clauses, where the overlay signal induced by the second load switching circuit includes a first overlay signal and a second overlay signal, where the pulse pattern has a pulse frequency, and where at least one of:
   a signal frequency of the first overlay signal, which is superimposed on one pulse of the plurality of pulses is less than a signal frequency of a second overlay signal, which is superimposed on another pulse of the plurality of pulses; and
   a signal amplitude of the first overlay signal is less than a signal amplitude of the second overlay signal.

9. The AFCI tester device of any of the preceding clauses, where the overlay signal is superimposed upon all pulses of the plurality of pulses.

10. The AFCI tester device of any of the preceding clauses, where at least one of the first and second load switching circuits includes a transistor.

11. A circuit assembly for testing an arc fault circuit interrupt (AFCI) device, the circuit assembly including:
   a first load switching circuit for creating a pulse pattern having a plurality of pulses;
   a second load switching circuit for creating an overlay signal superimposed upon at least one pulse of the plurality of pulses; and
   logic circuitry coupled to the first and second load switching circuits, where the logic circuitry is configured to:
      transmit a first control signal to the first load switching circuit to facilitate creating the pulse pattern; and
      transmit a second control signal to the second load switching circuit to facilitate creating the overlay signal.

12. The circuit assembly of clause 11, further including an interface adapted for coupling the first and second load switching circuits to an AFCI device under test (DUT).

13. The circuit assembly of any of the preceding clauses, where the interface is further adapted for transmitting the pulse pattern and the overlay signal to the AFCI DUT.

14. The circuit assembly of any of the preceding clauses, where the logic circuitry is further configured to:
   (a) transmit the first control signal to the first load switching circuit to facilitate at least one of:
      creating the pulse pattern at one or more predetermined pulse frequencies;
      creating the plurality of pulses at one or more predetermined pulse widths; and
      creating the plurality of pulses at one or more predetermined pulse amplitudes; and
   (b) transmit the second control signal to the second load switching circuit to facilitate at least one of:
      creating the overlay signal at one or more predetermined signal frequencies; and
      creating the overlay signal at one or more predetermined signal amplitudes.

15. The circuit assembly of any of the preceding clauses, where at least one pulse of the plurality of pulses has at least one of:
   a pulse width that is less than a pulse width of at least one other pulse of the plurality of pulses; and
   a pulse amplitude that is less than a pulse amplitude of the at least one other pulse.

16. The circuit assembly of any of the preceding clauses, where all pulses of the plurality of pulses have at least one of:
   substantially equal pulse widths; and
   substantially equal pulse amplitudes.

17. The circuit assembly of any of the preceding clauses, where the pulse pattern has a pulse frequency, and where the overlay signal has a signal frequency that is greater than the pulse frequency.

18. The circuit assembly of any of the preceding clauses, where the overlay signal is superimposed upon two or more pulses of the plurality of pulses.

19. The circuit assembly of any of the preceding clauses, where the overlay signal created by the second load switching circuit includes a first overlay signal and a second overlay signal, where the pulse pattern has a pulse frequency, and where at least one of:
   a signal frequency of the first overlay signal, which is superimposed on a first pulse of the two or more pulses, is less than a signal frequency of the second overlay signal, which is superimposed on a second pulse of the two or more pulses; and
   a signal amplitude of the first overlay signal is less than a signal amplitude of the second overlay signal.

20. The circuit assembly of any of the preceding clauses, where the overlay signal is superimposed upon all pulses of the plurality of pulses.

21. The circuit assembly of any of the preceding clauses, where at least one of the first and second load switching circuits includes a transistor.

22. A method for testing an arc fault circuit interrupt (AFCI) device, the method including:
   creating, by a first load switching circuit, a pulse pattern having a plurality of pulses;
   creating, by a second load switching circuit, an overlay signal superimposed upon at least one pulse of the plurality of pulses; and
   transmitting the pulse pattern and the overlay signal to an AFCI device under test.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An arc fault circuit interrupt (AFCI) tester device, comprising:
   a housing;
   a circuit assembly disposed within the housing and including:
      a first load switching circuit for creating a pulse pattern having a plurality of pulses;
      a second load switching circuit for creating an overlay signal superimposed upon at least one pulse of the plurality of pulses; and
      an interface receiving the plurality of pulses and the overlay signal, the interface extending outside of the housing and adapted for electrically coupling the circuit assembly to an AFCI device under test (DUT), the interface adapted to transmit the pulse pattern and the overlay signal to the AFCI DUT;
      wherein at least one pulse of the plurality of pulses has:
         a pulse width that is less than a pulse width of at least one other pulse of the plurality of pulses; and
         a pulse amplitude that is less than a pulse amplitude of the at least one other pulse.

2. The AFCI tester device of claim 1, further comprising logic circuitry coupled to the first and second load switching circuits of the circuit assembly, the logic circuitry being configured to:
   transmit a first control signal to the first load switching circuit to facilitate creating the pulse pattern; and
   transmit a second control signal to the second load switching circuit to facilitate creating the overlay signal.

3. The AFCI tester device of claim 2, wherein the logic circuitry is further configured to:
   (a) transmit the first control signal to the first load switching circuit to facilitate at least one of:

creating the pulse pattern at one or more predetermined pulse frequencies;
creating the plurality of pulses at one or more predetermined pulse widths; and
creating the plurality of pulses at one or more predetermined pulse amplitudes; and
(b) transmit the second control signal to the second load switching circuit to facilitate at least one of:
creating the overlay signal at one or more predetermined signal frequencies; and
creating the overlay signal at one or more predetermined signal amplitudes.

4. The AFCI tester device of claim 1, wherein at least two pulses of the plurality of pulses have at least one of:
substantially equal pulse widths; and
substantially equal pulse amplitudes.

5. The AFCI tester device of claim 1, wherein the pulse pattern has a pulse frequency, and wherein the overlay signal has a signal frequency that is greater than the pulse frequency.

6. The AFCI tester device of claim 1, wherein the overlay signal is superimposed upon a first two or more pulses of the plurality of pulses, and the overlay signal is not superimposed upon a second two or more pulses of the plurality of pulses.

7. The AFCI tester device of claim 1, wherein the overlay signal induced by the second load switching circuit includes a first overlay signal and a second overlay signal, wherein the pulse pattern has a pulse frequency, and wherein at least one of:
a signal frequency of the first overlay signal, which is superimposed on one pulse of the plurality of pulses is less than a signal frequency of a second overlay signal, which is superimposed on another pulse of the plurality of pulses; and
a signal amplitude of the first overlay signal is less than a signal amplitude of the second overlay signal.

8. The AFCI tester device of claim 1, wherein the overlay signal is superimposed upon all pulses of the plurality of pulses.

* * * * *